May 29, 1956  R. J. GARRAND  2,747,437
ADJUSTABLE ECCENTRIC BORING ATTACHMENT
FOR MULTIPLE SPINDLE LATHES
Filed March 16, 1955  3 Sheets-Sheet 1

Inventor
Roy J. Garrand

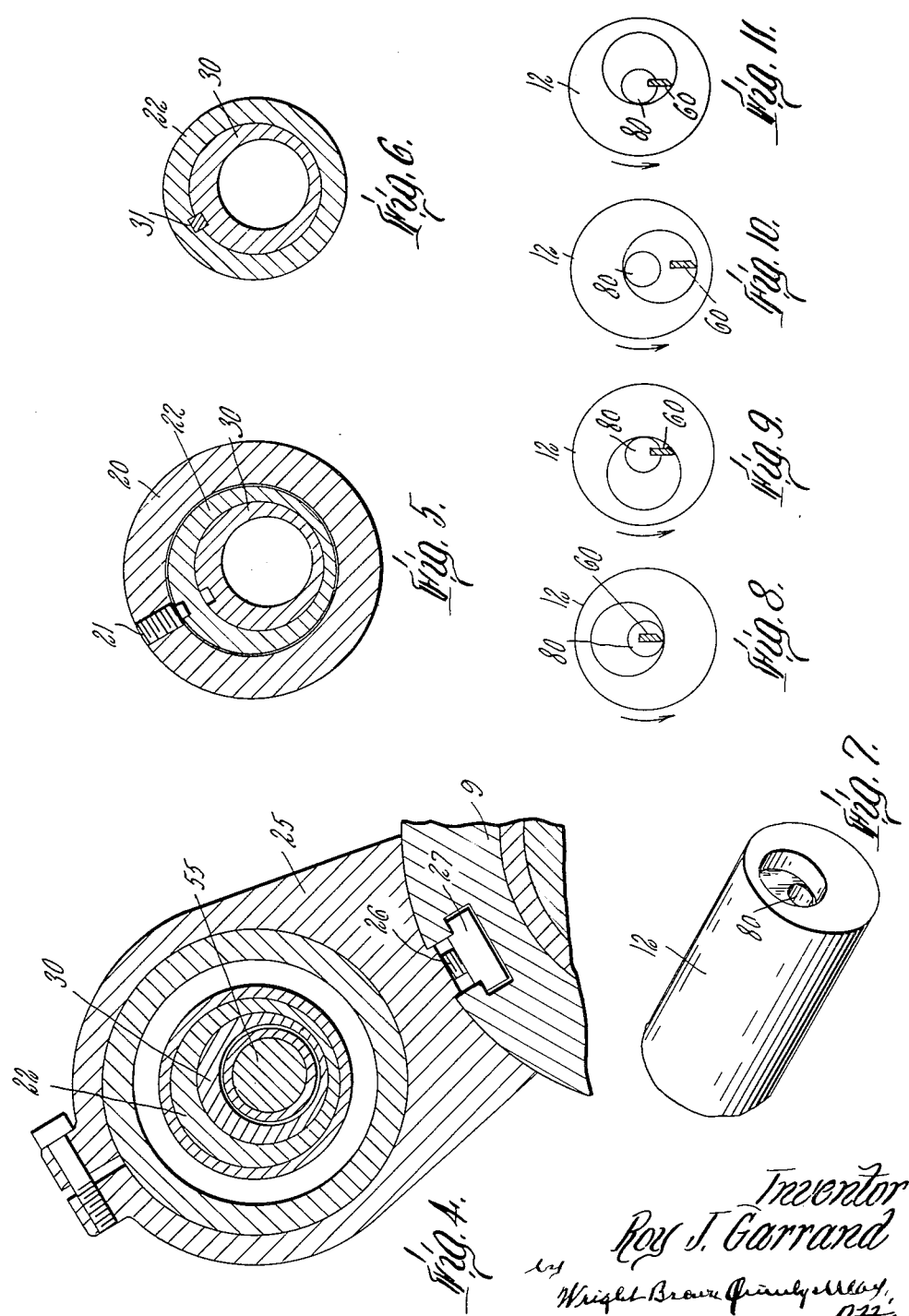

United States Patent Office 2,747,437
Patented May 29, 1956

2,747,437

ADJUSTABLE ECCENTRIC BORING ATTACHMENT FOR MULTIPLE SPINDLE LATHES

Roy J. Garrand, Plainfield, N. H., assignor to Cone Automatic Machine Company, Inc., Windsor, Vt., a corporation of Vermont Application March 16, 1955, Serial No. 494,695

5 Claims. (Cl. 77—3)

This invention relates to mechanism for boring holes in rotating work pieces eccentric to the axes of rotation of such work pieces, and is exemplified herein in an attachment for multiple spindle lathes. In such lathes the work-carrying spindles revolve about their own axes and are indexed to bring them successively into various tooling stations at one of which the desired eccentric boring is accomplished. The boring tool is held against rotation with the work spindle, but is given an orbital motion in time with such rotation and is fed axially with relation thereto to bore and be retracted with respect to a work piece carried by the spindle.

For a complete understanding of this invention reference may be had to the accompanying drawings in which Figure 1 is a fragmentary front elevation partly broken away and in section of a multiple spindle lathe embodying the invention.

Figures 4, 5 and 6 are detail sectional views on the correspondingly numbered section lines of Figure 3.

Figure 7 is a perspective view of a work piece provided with an eccentric hole as formed by the mechanism of this invention.

Figures 8 to 11, inclusive, are somewhat diagrammatic views illustrating the relation between the work piece and tool during successive angular positions of the work piece during a boring operation.

Figure 1:
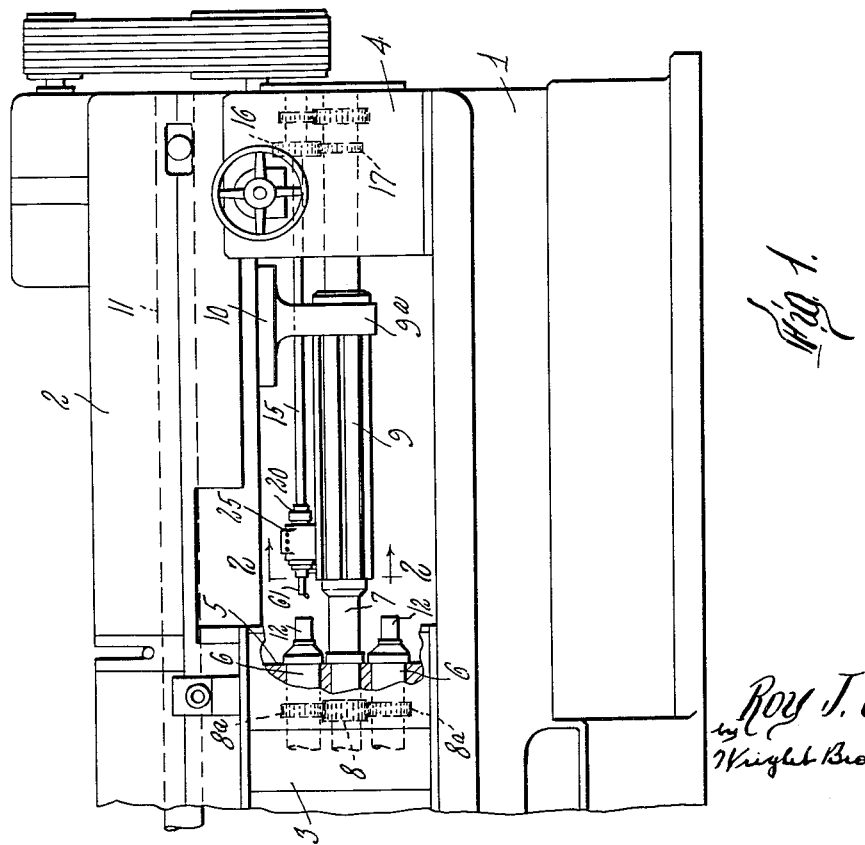

Referring to Figure 1, there is shown a multiple spindle lathe of well known type having a lower bed 1, an upper bed 2, and columns 3 and 4 joining said upper and lower beds at opposite ends of the machine. A multiple spindle holder 5 is supported within the column 3 and as shown this holder has a plurality of rotary work spindles 6 arranged in circular array about a central axis and movable by turning of the holder 5 from one to a succeeding tooling station, all as is well known in the art. These spindles are rotated and for this purpose the holder 5 carries a spindle shaft 7 which is provided with a gear 8 meshing with gears 8a on each of the several work spindles. By rotation of this shaft 7, the spindles are rotated in unison.

Mounted on the shaft 7 is an axially movable holder 9 which has attached thereto an arm 9a depending from a carriage 10 which is mounted for motion lengthwise of the machine and is caused to so move by suitable cams (not shown) on a cam shaft 11 in the upper bed 2, all as is well known in the art.

At one of the tooling stations, the holder 9 is provided with mechanism for drilling an eccentric hole in a work piece 12 carried by the spindle 6 which happens to be in alinement therewith at the particular station.

Figure 3:
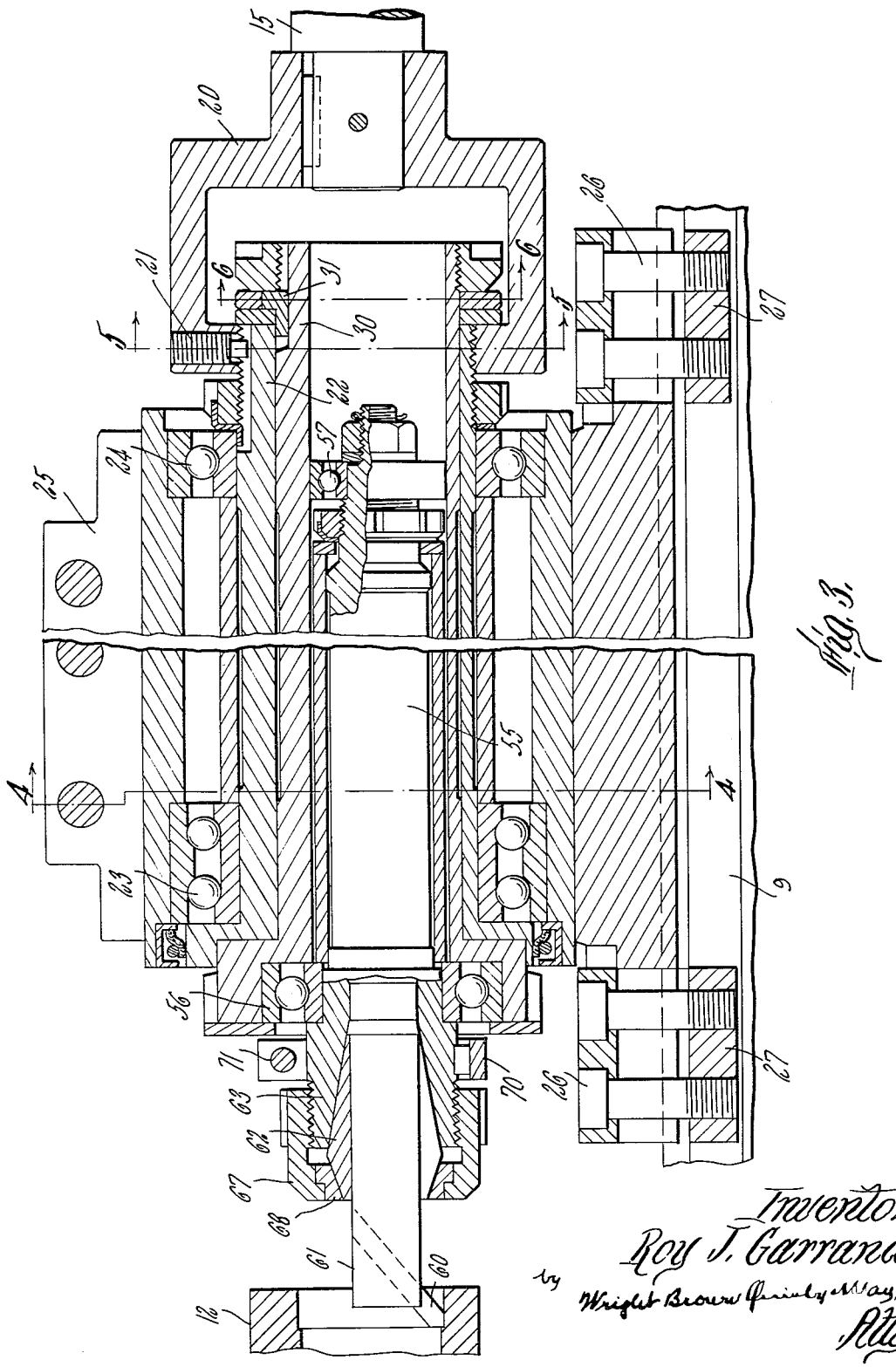
Figure 3 is a detail sectional view on line 3—3 of Figure 2.

A shaft 15 (Figures 1 and 3) is journaled in the columns 4 and is connected to be rotated by the shaft 7 as by intermeshing gears 16 and 17 by which the shaft 15 is rotated in time with the rotation of the spindles. The forward end of the shaft 15 has keyed thereto a yoke 20 which is connected as through a pin 21 to rotate a sleeve 22. This sleeve 22 is journaled in bearings 23 and 24, respectively, in a casing 25 which is fixed to the member 9 as by a bolt 26 and T head 27 shown in Figure 4. The casing 25, with the parts carried thereby, is thus caused to move axially of the spindles with the member 9 as this member 9 is moved by cams on the cam shaft 11.

Figure 2:
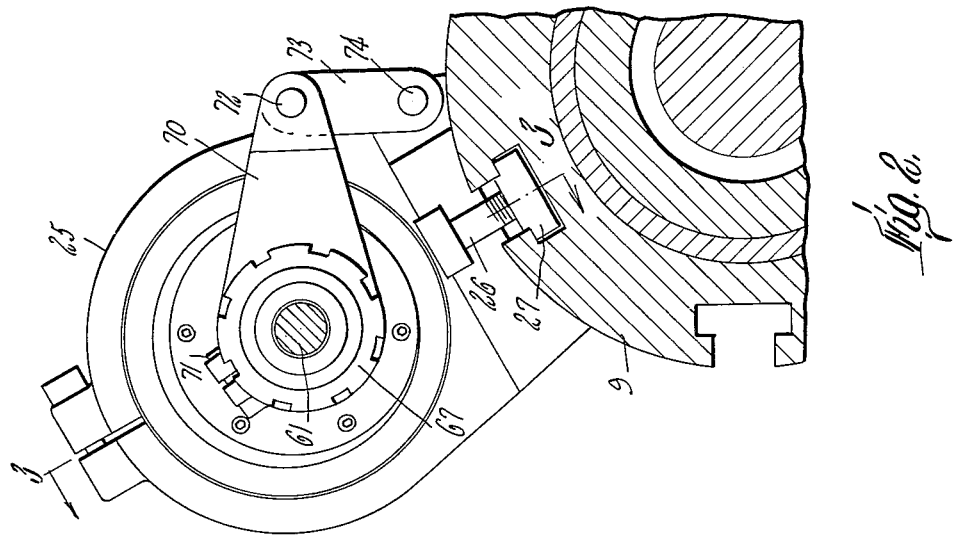
Figure 2 is a detail sectional view to a larger scale on line 2—2 of Figure 1.

The sleeve 22 has an eccentric bore therein in which is journaled a second eccentric sleeve 30 which is keyed to the sleeve 22 as by the key 31. Thus as the shaft 15 is rotated these sleeves are also rotated, but the interior bore of the inner sleeve is eccentric to the axis of rotation of these sleeves. Journaled in the inner sleeve 30 is a shaft 55, the outer end of which is supported in bearings 56. The inner end portion is supported in a bearing 57 within the bore of the sleeve 30. The forward end of the shaft 55 is provided with means for securing a tool therein. The tool, as shown, comprises a boring tool 60 which is held by a cylindrical tool holder 61 which is clamped concentrically to the shaft 55 as by wedge clamping members 62 and 63. The member 63, as shown, is integral with the shaft 55. A collar 67 is threaded on the outer end of the sleeve 63 and reacts with the internally tapered washer 68 carried thereby to clamp the member 62 against the tool holder 61 when the collar 67 is tightened onto the portion 63. The member 63 is held against rotation but is permitted an orbital motion with the shaft 55 within its eccentric sleeves 22 and 30. An arm 70 is clamped about the portion 63 as by the clamping bolt 71 (see Figure 2), and its outer end is connected through a pivot 72 with the outer end of a link 73, the inner end of which is pivoted at 74 to the tool support 9. This acts to retain the shaft 55 and its tool holder 61 against rotation with the eccentric sleeves 22 and 30, but permits an orbital motion thereof as the eccentric sleeves are rotated by the rotation of the shaft 15. Preferably at some station prior to the one where this boring attachment is operative, the holder 9 carries a drill for drilling a hole 80 (see Figures 7 and 11) concentric to the work piece 12 carried by the spindle at that particular station. At the station where the boring attachment of this invention is operative, the tool 60 is presented by axial motion of the carrier 9 to the end of the work piece eccentric to the hole 80, the tool 60 then enlarging the hole 80 eccentric to the work piece.

Various positions of the tool 60 in various angular positions of the work piece are shown in Figures 8 to 11, where it will be noted that the tool is maintained in a definite angular position but is moved in an orbital path during the rotation of the work piece. This causes the concentric hole 80 to become enlarged eccentrically to the work piece as the tool progresses axially into the work until the hole is bored to the desired depth, as shown, for example, in Figure 7. After this has been done retraction of the member 9 withdraws the tool from the work piece.

From the foregoing description of certain embodiments of this invention, it should be evident to those skilled in the art that various changes annd modifications may be made without departing from the spirit or scope thereof.

I claim:

1. In combination, a rotary work-carrying spindle, means for rotating said spindle, a rotary shaft in substantial alinement with said spindle, a support for said rotary shaft, means for rotating said shaft at the same angular velocity as said spindle, an eccentric shaft located between said spindle and said rotary shaft and coupled to said rotary shaft to be rotated thereby, a tool holder journaled with respect to said eccentric shaft, a boring tool carried by said holder, and means preventing said holder and tool from rotating with said eccentric shaft while permitting orbital motion of said holder and tool with said eccentric shaft, and means for moving said tool holder and tool lengthwise of said spindle.

2. In combination, a rotary work-carrying spindle, means for rotating said spindle, a rotary shaft in substantial alinement with said spindle, a support for said rotary shaft, means for rotating said shaft at the same angular velocity as said spindle, an eccentric shaft located between said spindle and said rotary shaft and coupled to said rotary shaft to be rotated thereby, a tool holder journaled with respect to said eccentric shaft, a boring tool carried by said holder, an arm fixed to said tool holder, and a link pivotally connecting said arm to said support for preventing rotation of said holder while permitting orbital motion thereof.

3. In combination, a rotary work carrying spindle, a hollow rotary shaft in substantial alinement with said spindle, a support for said rotary shaft, means for rotating said hollow shaft at the same angular velocity as said spindle, a shaft within said hollow shaft mounted eccentrically thereof, means coupling said rotary and said eccentric shaft together for simultaneous rotation, a tool holder journaled on said eccentric shaft, a tool on said holder for operating on work carried by said spindle, and means connecting said tool holder to said support preventing rotation of said tool and holder with said eccentric shaft while permitting orbital motion of said tool and holder about the axis of said hollow rotary shaft.

4. In combination, a rotary work carrying a spindle, a hollow rotary shaft in substantial alinement with said spindle, a support for said rotary shaft, means for rotating said hollow shaft at the same angular velocity as said spindle, a shaft within said hollow shaft mounted eccentrically thereof, means coupling said rotary and said eccentric shaft together for simultaneous rotation, a tool holder journaled on said eccentric shaft, a tool on said holder for operating on work carried by said spindle, means connecting said tool holder to said support preventing rotation of said tool and holder with said eccentric shaft while permitting orbital motion of said tool and holder about the axis of said hollow rotary shaft, and means for feeding said tool and holder axially of said spindle.

5. In combination, a rotary work carrying spindle, a hollow rotary shaft in substantial alinement with said spindle, a support for said rotary shaft, means for rotating said hollow shaft at the same angular velocity as said spindle, a shaft within said hollow shaft mounted eccentrically thereof, means coupling said rotary and said eccentric shaft together for simultaneous rotation, a tool holder journaled on said eccentric shaft, a tool on said holder for operating on work carried by said spindle, an arm fixed to said tool holder, a link pivoted at said arm and to the opposite end at said support, and means for moving said support and shaft tool and holder lengthwise of said spindle to feed and retract said tool relative to said work.

References Cited in the file of this patent
UNITED STATES PATENTS

| | | |
|---|---|---|
| 1,958,844 | Bullard | May 15, 1934 |
| 2,325,012 | Miller | July 20, 1943 |